(12) United States Patent
Kronenberg

(10) Patent No.: US 8,738,196 B2
(45) Date of Patent: May 27, 2014

(54) METHODS FOR LINKING MOTOR VEHICLES TO REDUCE AERODYNAMIC DRAG AND IMPROVE FUEL ECONOMY

(76) Inventor: David Kronenberg, Sherborn, MA (US)

( * ) Notice: Subject to any disclaimer, the term of this patent is extended or adjusted under 35 U.S.C. 154(b) by 11 days.

(21) Appl. No.: 13/165,010

(22) Filed: Jun. 21, 2011

(65) Prior Publication Data

US 2011/0270520 A1    Nov. 3, 2011

Related U.S. Application Data

(62) Division of application No. 12/240,557, filed on Sep. 29, 2008.

(51) Int. Cl.
*B60D 1/00* (2006.01)

(52) U.S. Cl.
USPC .............. 701/1; 701/29.3; 701/400; 701/408; 701/431; 701/482; 340/431; 340/438; 340/441; 340/988

(58) Field of Classification Search
CPC .................................. G06F 19/00; B60D 1/00
USPC .................... 701/29.3, 1, 400, 408, 431, 482; 340/431, 438, 441, 988
See application file for complete search history.

(56) References Cited

U.S. PATENT DOCUMENTS

| | | | |
|---|---|---|---|
| 4,590,739 A | 5/1986 | Abatti et al. | |
| 4,771,838 A | 9/1988 | Ketcham | |
| 6,286,892 B1 | 9/2001 | Bauer et al. | |
| 6,286,894 B1 | 9/2001 | Kingham | |
| 6,309,010 B1 | 10/2001 | Whitten | |
| 6,361,061 B1 | 3/2002 | Lea | |
| 6,402,228 B1 | 6/2002 | Chaffin | |
| 6,409,252 B1 | 6/2002 | Andrus | |
| 6,419,037 B1 | 7/2002 | Kramer et al. | |
| 6,419,301 B1 | 7/2002 | Tuerk | |
| 6,428,084 B1 | 8/2002 | Liss | |
| 6,457,766 B1 | 10/2002 | Telnack | |
| 6,467,833 B1 | 10/2002 | Travers | |
| 6,485,087 B1 | 11/2002 | Roberge et al. | |
| 6,523,629 B1 | 2/2003 | Buttz et al. | |
| 6,585,312 B2 | 7/2003 | Jain | |

(Continued)

FOREIGN PATENT DOCUMENTS

JP    07-200991 A    8/1995
KR    10-019975 B1    6/1999

OTHER PUBLICATIONS

International Search Report & Written Opinion issued in related PCT Application No. PCT/US2009/058567; report dated Apr. 20, 2010.

*Primary Examiner* — John R Olszewski
*Assistant Examiner* — Truc M Do
(74) *Attorney, Agent, or Firm* — Miller, Matthias & Hull LLP

(57) ABSTRACT

Methods for linking two or more vehicles to achieve reduced aerodynamic drag while the vehicles are travelling on the road are disclosed. The disclosed methods utilize a dynamic linking system that not only physically connects the vehicles but also allows the driver of the leading vehicle to monitor and control essential functions of the trailing vehicles. Preferably, the driving mechanisms of the trailing vehicles, such as throttles, brakes, and gears, are fully operational so as not to put excessive burden on the driving mechanisms of the leading vehicle. Methods for linking individual vehicles as well as streamlining the operation of a fleet of vehicles are also disclosed.

6 Claims, 5 Drawing Sheets

(56) References Cited

U.S. PATENT DOCUMENTS

| | | | |
|---|---|---|---|
| 6,595,578 B1 | 7/2003 | Calsoyds et al. | |
| 6,616,188 B1 | 9/2003 | Jefferies et al. | |
| 6,616,218 B2 | 9/2003 | Bauer et al. | |
| 6,634,700 B1 | 10/2003 | Calvert | |
| 6,644,720 B2 | 11/2003 | Long et al. | |
| 6,666,498 B1 | 12/2003 | Whitten | |
| 6,669,270 B1 | 12/2003 | Card et al. | |
| 6,685,256 B1 | 2/2004 | Shermer | |
| 6,742,616 B2 | 6/2004 | Leban | |
| 6,748,320 B2 * | 6/2004 | Jones | 701/465 |
| 6,779,834 B1 | 8/2004 | Keller | |
| 6,789,839 B1 | 9/2004 | Samuelson | |
| 6,793,273 B2 | 9/2004 | Tuerk | |
| 6,799,791 B2 | 10/2004 | Reiman et al. | |
| 6,799,793 B1 | 10/2004 | Sladen | |
| 6,821,007 B1 | 11/2004 | Olman et al. | |
| 6,837,536 B1 | 1/2005 | Schwartz | |
| 6,854,788 B1 | 2/2005 | Graham | |
| 6,877,793 B2 | 4/2005 | Cory | |
| 6,886,882 B2 | 5/2005 | Farlow et al. | |
| 6,926,345 B2 | 8/2005 | Ortega et al. | |
| 6,959,958 B2 | 11/2005 | Basford | |
| 6,974,178 B2 | 12/2005 | Ortega et al. | |
| 6,979,049 B2 | 12/2005 | Ortega et al. | |
| 6,986,544 B2 | 1/2006 | Wood | |
| 7,008,004 B2 | 3/2006 | Ortega et al. | |
| 7,008,005 B1 | 3/2006 | Graham | |
| 7,073,845 B2 | 7/2006 | Ortega et al. | |
| 7,085,775 B2 * | 8/2006 | Short et al. | 1/1 |
| 7,093,889 B2 | 8/2006 | Graham | |
| 7,147,070 B2 | 12/2006 | Leclerc | |
| 7,165,804 B2 | 1/2007 | Shahbazi | |
| 7,185,944 B2 | 3/2007 | Shahbazi | |
| 7,195,267 B1 | 3/2007 | Thompson | |
| 7,207,620 B2 | 4/2007 | Cosgrove et al. | |
| 7,216,923 B2 | 5/2007 | Wong et al. | |
| 7,226,117 B2 | 6/2007 | Preiss | |
| 7,234,760 B1 | 6/2007 | Crean | |
| 7,234,761 B1 | 6/2007 | Crean | |
| 7,240,958 B2 | 7/2007 | Skopic | |
| 7,243,980 B2 | 7/2007 | Vala | |
| 7,261,353 B2 | 8/2007 | Storms | |
| 7,760,077 B2 * | 7/2010 | Day | 340/431 |
| 8,100,426 B2 * | 1/2012 | Kronenberg | 280/411.1 |
| 8,131,456 B2 * | 3/2012 | Mahalingaiah et al. | 701/117 |
| 8,275,508 B1 * | 9/2012 | Adams et al. | 701/29.3 |
| 2004/0039504 A1 * | 2/2004 | Coffee et al. | 701/35 |
| 2006/0136291 A1 * | 6/2006 | Morita et al. | 705/13 |
| 2006/0200008 A1 * | 9/2006 | Moore-Ede | 600/300 |
| 2008/0042399 A1 | 2/2008 | Smith | |
| 2008/0071428 A1 * | 3/2008 | Kim | 701/1 |
| 2008/0303648 A1 * | 12/2008 | Day | 340/431 |
| 2009/0055091 A1 * | 2/2009 | Hines et al. | 701/207 |
| 2009/0157461 A1 * | 6/2009 | Wright et al. | 705/8 |
| 2010/0044998 A1 * | 2/2010 | Franchineau | 280/491.1 |

* cited by examiner

METHODS FOR LINKING MOTOR VEHICLES TO REDUCE AERODYNAMIC DRAG AND IMPROVE FUEL ECONOMY

CROSS-REFERENCE TO RELATED APPLICATIONS

This application is a divisional application claiming priority to U.S. patent application Ser. No. 12/240,557 filed on Sep. 29, 2008.

BACKGROUND

1. Technical Field

Methods for linking two or more vehicles to achieve reduced collective aerodynamic drag while the vehicles are travelling on the road are disclosed. The disclosed methods utilize a dynamic linking system that not only physically connects the vehicles but also allows the driver of the leading vehicle to monitor and control essential functions of the trailing vehicles. Preferably, the driving mechanisms of the trailing vehicles, such as throttles, brakes, and gears, are fully operational so as not to put excessive burden on the driving mechanisms of the leading vehicle. Methods for linking individual vehicles as well as streamlining the operation of a fleet of vehicles are also disclosed.

2. Description of the Related Art

A significant portion of the energy expended by motor vehicles is to overcome aerodynamic drag. In order to improve fuel economy and conserve energy, a wide variety of devices and methods have been developed in the art to reduce aerodynamic drag of motor vehicles. For example, the vehicles may be provided with particularly shaped deflectors, spoilers, side ridges and/or side grooves. Alternatively, the shape of the vehicle or exterior component thereof may be streamlined or rounded. However, those devices or methods are generally directed to improve aerodynamic drag of a single operating vehicle or a tractor trailer assembly. The collective aerodynamic improvement of two or more motor vehicles, each of which independently operational, has yet to be disclosed.

Devices and assemblies for linking two motor vehicles are also known in the art. In particular, when one non-operating vehicle needs to be towed by an operating vehicle to a designated location, the two vehicles may be mechanically connected to each other by simple devices or assemblies, such as tow hitches or tow bars connected to the chassis of the vehicles. In some case, the tow hitches can take the form of a tow-ball to allow swivelling and articulation of a trailer, or a tow pin and jaw with a trailer loop, which are often used for large or agricultural vehicles. A further category is towing pintles used for military vehicles around the world with a hook and locking catch. However, as the non-operating vehicles are almost completely deactivated during towing, none of the known linking devices or assemblies involves the use of an active (e.g. extendable-retractable) member on the trailing vehicle that engages with a passive member on the leading vehicle. Nor is there a known linking mechanism purported to operate two or more motor vehicles to reduce their collective aerodynamic drag.

In addition, because the towed vehicles are generally deactivated during towing, the driving mechanisms of the towing vehicles, such as throttles, brakes, and gears, inevitably incur excessive wear and tear, which may adversely affect the overall performance and energy efficiency of the two connected vehicles.

As an improvement of the aforementioned deficiencies, self-propelled trailers have been developed in the art. The trailers may include a slave power source, such as an internal combustion engine, to supply driving force to its wheels. When coupled to a tractor, the self-propelled trailer improves the collective energy efficiency of the tractor-trailer tandem. However, the slave power source of the trailer may only operate to supplement the tractor and generally does not operate to drive the trailer alone without the tractor.

Hence, there is a need for a linking system or method that links two fully operational motor vehicles for reducing their collective aerodynamic drag. Moreover, there is a need for a linking system or method that allows the driver of the leading vehicle to monitor and control the essential driving mechanisms of the trailing vehicle. Further, there is a need for a linking system that can interconnect two or more motor vehicles, wherein the linking system can disconnect the linked vehicles in motion. Finally, there is a need for streamlining the operation of a fleet of vehicles by identifying vehicles with suitable itineraries that are compatible in route and timing so as to be able to utilize the linking system to reduce aerodynamic drag and optimize fuel economy.

SUMMARY OF THE DISCLOSURE

This disclosure is directed toward methods for linking two or more fully operational motor vehicles to reduce their collective aerodynamic drag while the vehicles are travelling on the road. The disclosed methods utilize a dynamic linking system that not only physically connects the vehicles but also allows the driver of the leading vehicle to monitor and control essential functions of the trailing vehicle. In one embodiment, the linking system may connect and disconnect the motor vehicles while they are in motion. In another embodiment, the linking system may disconnect, but may not connect, the motor vehicles in motion.

In a general embodiment, the disclosed method comprises the steps of providing a leading motor vehicle, providing a trailing motor vehicle, linking the two vehicles by using a dynamic linking system, and allowing the driver of the leading vehicle to simultaneously operate both the leading and trailing motor vehicles.

The linking system generally includes a linking assembly comprising an active member having an arm positioned on the trailing motor vehicle, a passive member having a receiving area positioned on the leading motor vehicle, and a control unit that monitors and controls the linking of the vehicles. In some embodiments, the active member may be positioned on the leading vehicle and the passive member may be positioned on the trailing vehicle.

In use, the arm of the active member may be vertically and/or horizontally aligned to the receiving area of the passive member by the operation of the control unit to form a mechanical connection between the leading and trailing vehicles. Numerous types of mechanical connections known in the art may be used in the disclosed methods without undue experimentation.

In order to control the driving mechanisms of the trailing vehicle, the linking system may also include a control member that operatively connects the driving mechanisms of the leading and trailing vehicles, wherein the operative connection may be one or various combinations of electrical, mechanical, wireless, and other operative connections known in the art. In one embodiment, the control member enables the driver of the leading vehicle to have full and simultaneous control of both the leading and the trailing vehicle.

Further, in order to monitor the operation of the linked vehicles, the linking system may also include a communication member that monitors essential driving parameters of the vehicles, wherein the monitoring member may be one or various combinations of sensors, detectors, processors, cameras, and other monitoring means known in the art.

In order to form the linkage between the leading and trailing vehicles, the driver of the vehicle equipped with the active member may extend the arm of the active member and engage the receiving area of the passive member of the other vehicle by using the control unit of the system.

Once the mechanical linkage is formed, the linking system allows the driver of the leading vehicle to monitor and control the essential functions of the trailing vehicle, such as throttle, brakes, gearing, signal indicator, etc. As a result, the driver of the leading vehicle operates the driving mechanisms of both the leading and trailing vehicles. In another embodiment, the linking system may also be used in a towing operation where the operation of the trailing vehicle is substantially deactivated.

The dynamic linkage between the leading and trailing vehicles may be disconnected by either driver as desired, especially when the operation conditions require individual manipulation of the vehicles such as in tight corners and weight stations or during emergency maneuvers. To disconnect, either driver may operate the control unit of the linking system to remove the arm of the active member from the receiving area of the passive member. Because both vehicles may still be fully operational at the time of disconnection, the drivers of both vehicles may continue their individual operation of the vehicle with minimum delay.

The disclosed method may also allow the linking of the leading and trailing vehicles while they are in motion. In order to accomplish this, the linking system is designed so that the leading and trailing vehicles do not need to be in perfect alignment when the mechanical connection therebetween is established. As a result, the linkage may be formed in motion when the speeds of the vehicles are moderate and the drivers of the vehicles are reasonably skilled in the linking process. Specifically, in a fully automated embodiment, the control unit is activated when the leading and trailing vehicles are in alignment and within an appropriate range, e.g. less than 100 meters. The control unit then operates both vehicles' cruise control systems to gradually bring the vehicles together to a suitable distance for the formation of the dynamic linkage.

The linking system may be used in a fleet of vehicles to streamline their operation and improve their collective energy efficiency. For example, a fleet dispatcher may identify vehicles of the fleet with overlapping routes before dispatching those vehicles so that the drivers of the vehicles can be provided with the time and location of the scheduled linking. At the end of the overlapping route, the dispatcher may instruct the drivers to disconnect the linked vehicle so that the individual vehicles can pursue their separate destinations.

The disclosed system may also be used by individual vehicles through a commonly accessible Central Information and Dispatch (CID) database. In use, individual drivers who wish to link up with other vehicles to reduce aerodynamic drag may upload their itineraries into the CID database, where the itineraries are matched by a processor. For example, the matching of the itineraries may be accomplished by a computer program or a human being. Upon identification of similar and overlapping routes and schedules, the CID database may inform the drivers about the time and location of the proposed link.

Other advantages and features will be apparent from the following detailed description when read in conjunction with the attached drawings. It will also be noted here and elsewhere that the methods and systems disclosed herein may be suitably modified to be used in a wide variety of motor vehicle combinations by one of ordinary skill in the art without undue experimentation.

BRIEF DESCRIPTION OF THE DRAWINGS

For a more complete understanding of the disclosed method, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed linking system or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
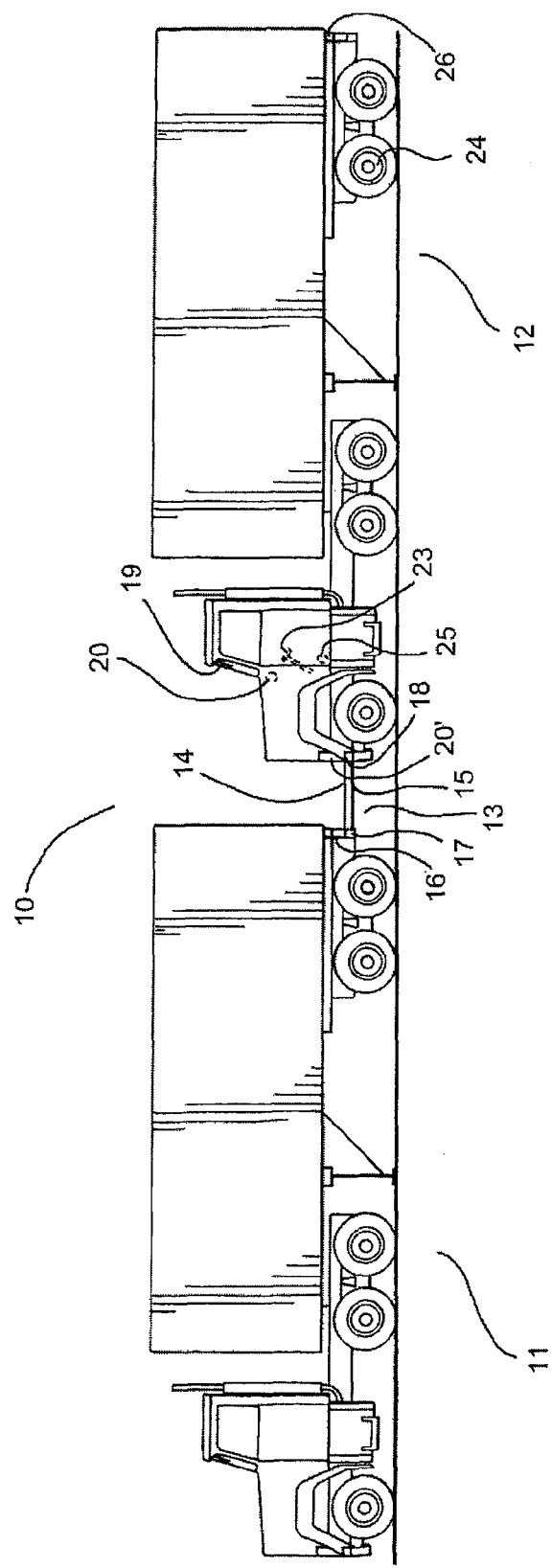
FIG. 1 is a side plan view of one embodiment of the linking system in accordance with this disclosure, particularly illustrating the leading and trailing motor vehicles linked together by the disclosed linking system.

A system 10 for linking a leading vehicle 11 and a trailing vehicle 12 to reduce their collective aerodynamic drag is shown in FIG. 1. The system 10 may include a dynamic linking assembly 13 that comprises an active member 14 having an arm 15 positioned on the trailing vehicle 12, a passive member 16 having a receiving area 17 positioned on the leading vehicle 11, and a control unit 18 coupled to the active member 14 for monitoring and controlling the linking of the vehicles. In one embodiment, the arm 15 of the active member 14 may be extended, retracted, or otherwise positioned by the control unit 18. Although FIG. 1 illustrates the active member 14 as being positioned on the trailing vehicle 12 and the passive member 16 as being positioned on the leading vehicle 11, it is understood that they may also be positioned vice versa within the scope of this disclosure.

Although illustrated in FIG. 1 as "semis" or "tractor-trailer" trucks, the leading and trailing vehicles (11, 12) may be any motor vehicles known in the art, including, but not limited to, sedans, coupes, convertibles, sports utility vehicles, wagons, minivans, personal trucks, commercial trucks, and the like. The leading and trailing vehicles (11, 12) may be of the same type and size, or they may be different, in which case the positioning of one vehicle in front of the other may offer more reduction of aerodynamic drag and energy efficiency than vice versa.

Figure 2:
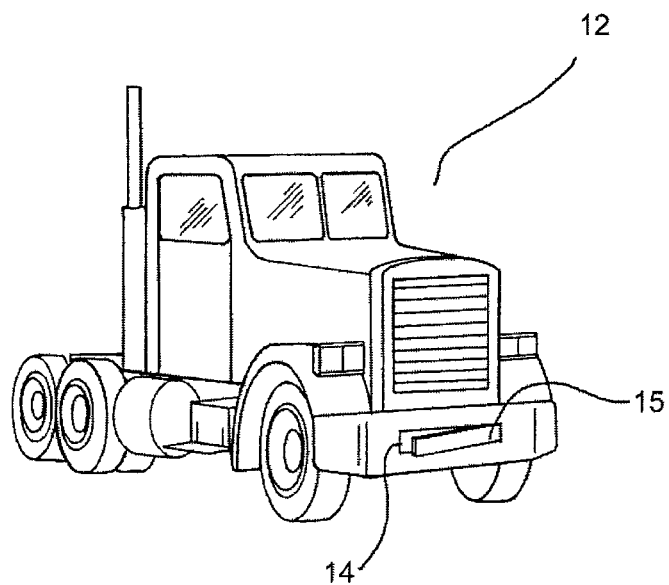
FIG. 2 is a front perspective view of the trailing motor vehicle of FIG. 1, particularly illustrating the active member of the linking system.

Turning to FIG. 2, the active member 14 and the control unit 18 coupled thereto is shown to be positioned on the lower section of the front of the trailing vehicle. In order to improve the structural rigidity of the linking system 10, the active member 14 may be directly connected to the front chassis of the trailing vehicle 12, such as by welding or other attachment procedures known in the art. In one embodiment, the arm 15 of the active member 14 is in a retracted position when the trailing vehicle 12 is not linked to the leading vehicle 11. As a result, the front end of the trailing vehicle 12 retains its smooth profile for better aerodynamics and safer operation. Although the arm 15 may be a scissors arrangement shown in FIG. 2, other arrangements, such as telescoping tubes, robotic arms, hydraulic cylinder and the like may be used as well.

Figure 3:
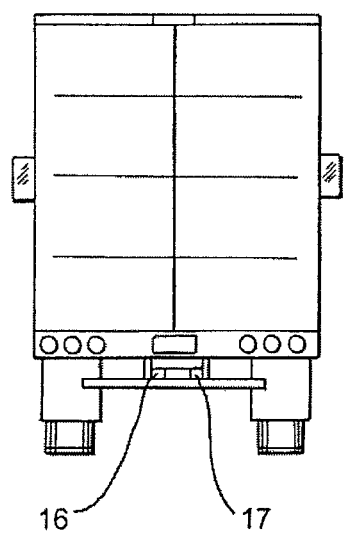
FIG. 3 is a back plan view of the leading motor vehicle of FIG. 1, particularly illustrating the passive member of the linking system.

Similarly, the passive member 16 may be positioned on the lower section of the back of the leading vehicle, as illustrated in FIG. 3. Again, the passive member 16 may be directly connected to the back chassis of the trailing vehicle 12 in order to improve the structural rigidity of the linking system 10. The passive member 16 further comprises a receiving area 17 that is adapted to receive the arm 15 of the active member 14 thereby forming a strong mechanical linkage between the leading and trailing vehicles (11, 12).

In one embodiment, the passive member 16 may be of a unique, proprietary configuration. In another embodiment, the passive member 16 may be an existing under-ride protection already installed on Class 7 trucks and all semi-trailers in the United States. It is noteworthy, however, that the under-ride protection may need to be reinforced to withstand the load of the trailing vehicles.

In the embodiment in which the passive member is the existing under-ride protection device discussed above, the active means may be constructed to engage with the passive member at the standard height of the under-ride protection device. In the embodiment in which the passive member is of a unique, proprietary configuration, both the active and passive members may be installed on the respective vehicles at the appropriate heights and locations to facilitate the engagement therebetween.

In one embodiment, the mechanical linkage may be a towball and a ball joint type to allow swivelling and articulation of the trailing vehicle 12. In another embodiment, the linkage may take the form of a tow pin and jaw with a trailer loop. In another embodiment, a towing pintle with a hook and locking catch may be used. In yet another embodiment, the mechanical linkage is formed when one or more jaws grasps either an under-ride protection or a proprietary receiving member. To ensure proper mechanical strength of the linkage, either or both of the active and passive members of the linking assembly may be constructed of steel, aluminum, metal alloys or other sufficiently strong and rigid material to withstand the stresses of differential movement between the two vehicles, due to road conditions or otherwise.

The control unit 18 may include a power source (not shown) that is operatively associated with the arm 15 of the active member 14 to extend the arm 15 during linking operation and to retract the arm 15 when the vehicles are to be disconnected. The power source also operates to adjust the vertical and horizontal position of the arm 15. In one embodiment, the power source may be a power actuator that is operatively associated with an existing hydraulic system or compressed air system of the vehicle. In another embodiment, the power source may be an electric motor operatively associated with an electric system of the vehicle. In yet another embodiment, the power source maybe independent of the vehicle, e.g. a motor not operatively associated with the driving and/or electric systems of the vehicle.

In one embodiment, the power source may be manually controlled by the driver of the trailing vehicle 12 through a position device 20 operatively connected to the power source and a closed-circuit video camera 20' showing the position of the arm 15 during the linking process. The positioning device may be one or more joysticks, buttons, switches, combinations thereof, or any other means known in the art. In another embodiment, the power source may be automatically controlled by an automatic alignment system comprising an RF signal generator attached to or embedded in the passive member 16, and an RF signal receiver and a microprocessor operatively connected to the power source and attached to or embedded in the active member 14. In another embodiment, the automatic alignment system may include an optical target with robotic control system to align the active and passive members (14, 16).

During the linking process, the arm 15 of the active member 14 extends from the retracted position towards the passive member 16. To ensure safety during the linking process, especially during linking when the vehicles are still in motion, the active member 14 may be extendable up to a desirable distance, such as from about 0 to about 20 feet and more preferably from about 6 to about 20 feet. This range is by way of example only and other ranges are certainly possible and within the scope of this disclosure. The position of the arm may be vertically and/or horizontally adjusted by the control unit 18 so that the arm 15 aligns with the receiving area 17 of the passive member 16, thereby forming a secure mechanical connection between the vehicles. Once the linkage is established, the linking assembly 13 may keep the linked vehicles at either a fixed or adjustable distance from each other. In a further embodiment, the linking assembly may include a suspension and damping device to limit the relative movement of the two linked vehicles.

Because the linking system is extendable and retractable, as well as vertically and horizontally adjustable, the leading and trailing vehicles (11, 12) do not have to be in perfect alignment during the linking process. Instead, any minor misalignment during the linking process may be self-corrected after the two vehicles are linked together. In order to facilitate the initial rough alignment of the two vehicle, the linking system 10 may further include an aiming device 19 provided on the vehicle that is equipped with the active member 14. The aiming device may be in the form of position marks provided on the windshield of the vehicle, or a video camera showing the vehicle to be aligned with and allowing the driver to locate the receiving area 17 of the passive member 16.

In order to control the driving mechanisms of the trailing vehicle(s), the linking system may also include a control member that operatively connects the driving mechanisms of the leading and trailing vehicles, wherein the operative connection may be one or various combinations of electrical, mechanical, wireless, and other operative connections known in the art. In one embodiment, the control member allows the driver of the leading vehicle to exert full and simultaneous control of the essential driving mechanisms of both the leading and trailing vehicles. The location and configuration of the control member would be apparent to one of ordinary skill in the art without undue experimentation.

In one embodiment, the control member includes one or more hard-wired control devices in operative association with the driving mechanisms of the two vehicles. In another embodiment, the hard-wired devices may be substituted with wireless devices and assemblies, such as bluetooth-type modules using RF, IR or other frequencies. In a preferred embodiment, the control member utilizes RF-bluetooth technology to effectuate the control of the driving mechanisms. As a result, the driver of the leading vehicle may exert full control of the driving mechanism, such as throttle 23, brake 24, gear 25, and signal system 26 of the trailing vehicle after the linkage is established.

It is noteworthy that the locations of the position device 20, camera 20', throttle 23, brake 24, gear 25, and signal system 26 illustrated in FIG. 1 are for demonstration purpose only. Relocation of one or more of those structural elements would be apparent to one of ordinary skill in the art and should be considered as within the scope of this disclosure.

Further, in order to monitor the operation of the linked vehicle(s), the linking system may also include a communication member that monitors essential driving parameters of the vehicles, wherein the communication member may be one or various combinations of sensors, detectors, processors, cameras and other monitoring means known in the art. Again, the location and configuration of the communication member would be apparent to one of ordinary skill in the art without undue experimentation.

In one embodiment, the communication member includes one or more hard-wired communication devices such as video components that allows the drivers of the leading and trailing vehicles (11, 12) to monitor the road conditions and road signs, or audio components that allows both drivers to communicate with each other about the operation of the vehicles and other important information. In another embodiment, the hard-wired devices may be substituted with wireless devices and assemblies discussed above. In one embodiment, the mechanical engagement of the linking assembly 13 also activates the control and communication members of the linking system. In another preferred embodiment, the engagement of the control and communication members may independent of the engagement of the mechanical linkage. For example, the control and communication members may be engaged well before the mechanical linkage is established.

The dynamic linkage between the leading and trailing vehicles may be disconnected by either driver as desired. This function is particularly useful when the operating conditions require individual manipulation of the vehicle such as in tight corners and weigh stations. It is also useful during emergency maneuvers such as when road and/or traffic conditions require. Thus, both the leading and the trailing vehicles may be provided with a voluntary disengage switch that is operatively connected to the motor of the linking assembly 13. Upon activation, the switch operates the motor to move the arm 15 of the active member 14 out of the receiving areas 17 of the passive member 16, thereby disconnecting the two vehicles. Because both vehicles are still fully operational at the time of disconnection, the drivers of both vehicles may continue their individual operation of the vehicle with minimum delay.

In one embodiment, the linking system allows the connection of the vehicles while they are stationary. The driver of the trailing vehicle 12 positions the vehicle behind the leading vehicle 11 at a proper distance and in proper alignment. The arm 15 of the active member 14 is then activated to extend and engage the receiving area 17 of the passive member 16.

In another embodiment, the linking system may also allow the linking of the vehicles while they are in motion. In order to accomplish this, the linking system is designed so that the leading and trailing vehicles do not need to be in perfect alignment when the mechanical connection therebetween is established. Further, the linking system may include a programmable adaptive cruise control system to safely bring the vehicles to be linked to close proximity and alignment with each other before the activation of the arm 15. Of course, the speeds of the vehicles should be moderate and the drivers of the vehicles should be reasonably skilled in the linking process to ensure safety when two vehicles are linked in motion.

Figure 4:
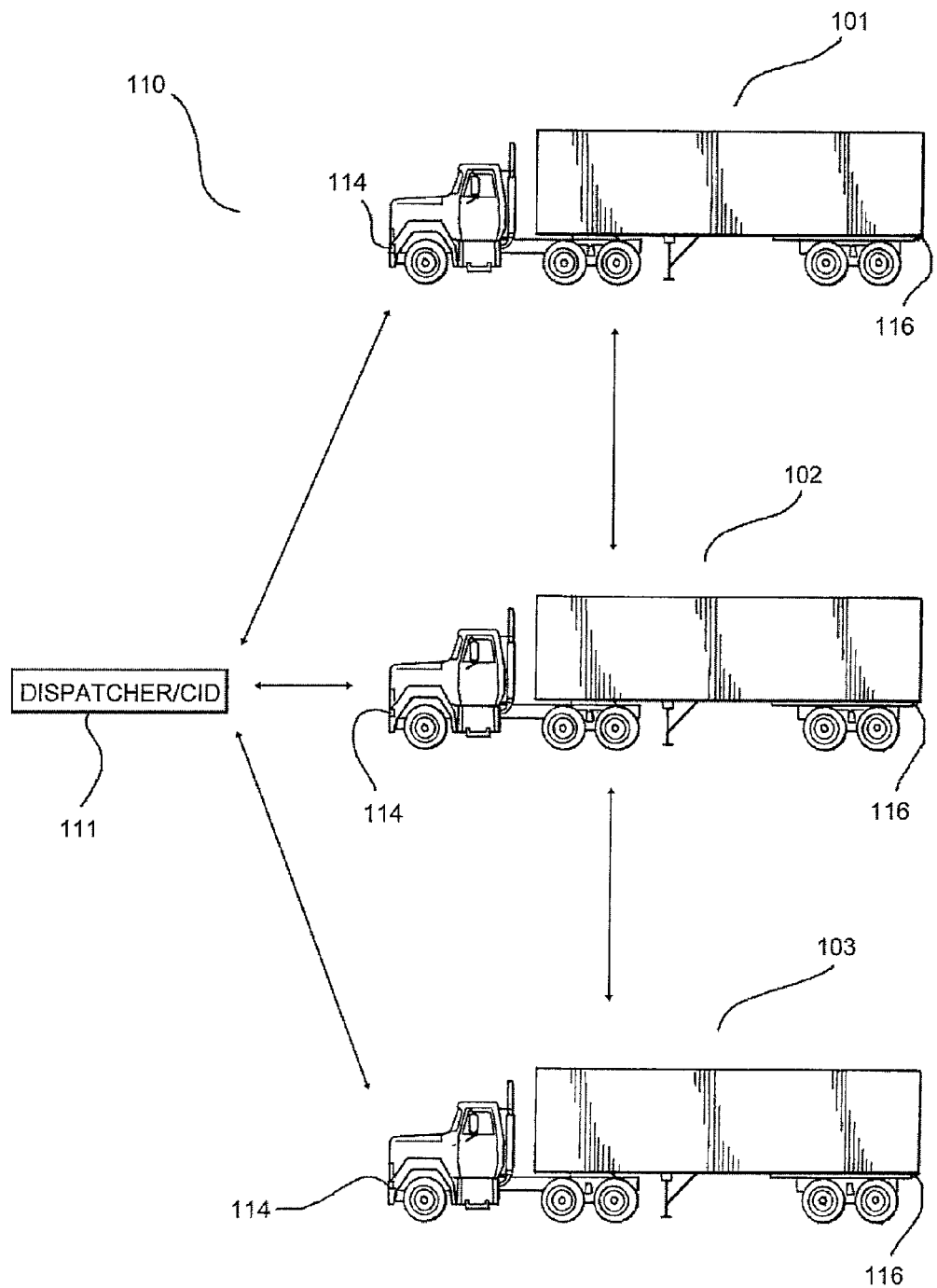
FIG. 4 is a schematic representation of a multi-vehicle management system in accordance with this disclosure.

Turning to FIG. 4, the linking system 110 may be used in the operation of a fleet of vehicles (101, 102, 103) to streamline their logistical operation and improve their collective energy efficiency. In one embodiment, each vehicle of the fleet is equipped with an active member 114 in the front and a passive member 116 in the back. In operation, a fleet dispatcher is provided with the routes and itineraries of each vehicle of the fleet. The dispatcher then identifies vehicles of the fleet with maximized overlapping routes before dispatching those vehicles so that the drivers of the vehicles can be provided with the time and location of the scheduled linking. At the end of the overlapping route, the dispatcher may instruct the drivers to disconnect the linked vehicles so that the disconnected vehicles can continue pursuing their separate destinations. The communication between the dispatcher and the drivers as well as between the drivers (shown as double-headed arrows in FIG. 4) may be accomplished through a wide variety of communication means including, but not limited to, on-board computers, radios, cellphones, PDAs, etc.

The linking system 110 may also be used by individual vehicles through a commonly accessible Central Information and Dispatch (CID) database 111, as shown in FIG. 4. In one embodiment, the CID database 111 is in a form of a website or search engine on the Internet. In use, individual drivers who wish to link up with other vehicles to reduce aerodynamic drag may upload their itineraries and routes into the CID database 111, where the uploaded information is matched by a processor (not shown). Upon identification and maximizing the overlapping routes and itineraries, the CID database 111 may inform the drivers about the time and location of the proposed link. Again, the communication between the CID database 111 and the drivers as well as between the drivers (shown as double-headed arrows in FIG. 4) may be accomplished through a wide variety of communication means including, but not limited to, on-board computers, radios, cellphones, PDAs, etc.

Figure 5:
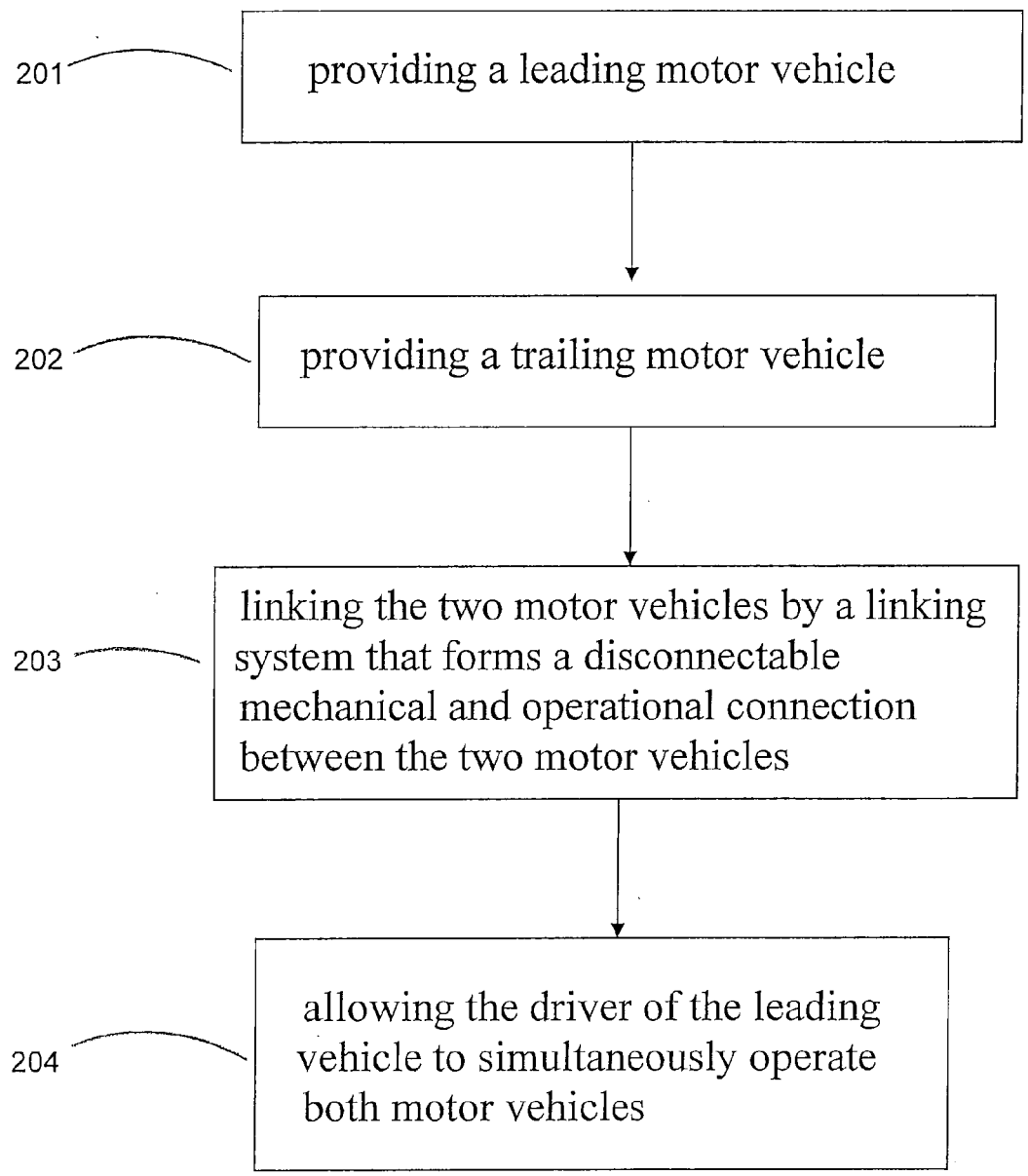
FIG. 5 is a flow chart depicting one embodiment of the disclosed method.

Turning now to FIG. 5, which depicts a flow chart of an embodiment of the disclosed method for reducing the collective aerodynamic drag of two vehicles. The method may include the steps of: providing a leading motor vehicle 201; providing a trailing motor vehicle 202; linking the two motor vehicles by a linking system that forms a disconnectable mechanical and operational connection between the two motor vehicles 203; and allowing the driver of the leading vehicle to simultaneously operate both motor vehicles 204.

Figure 6:
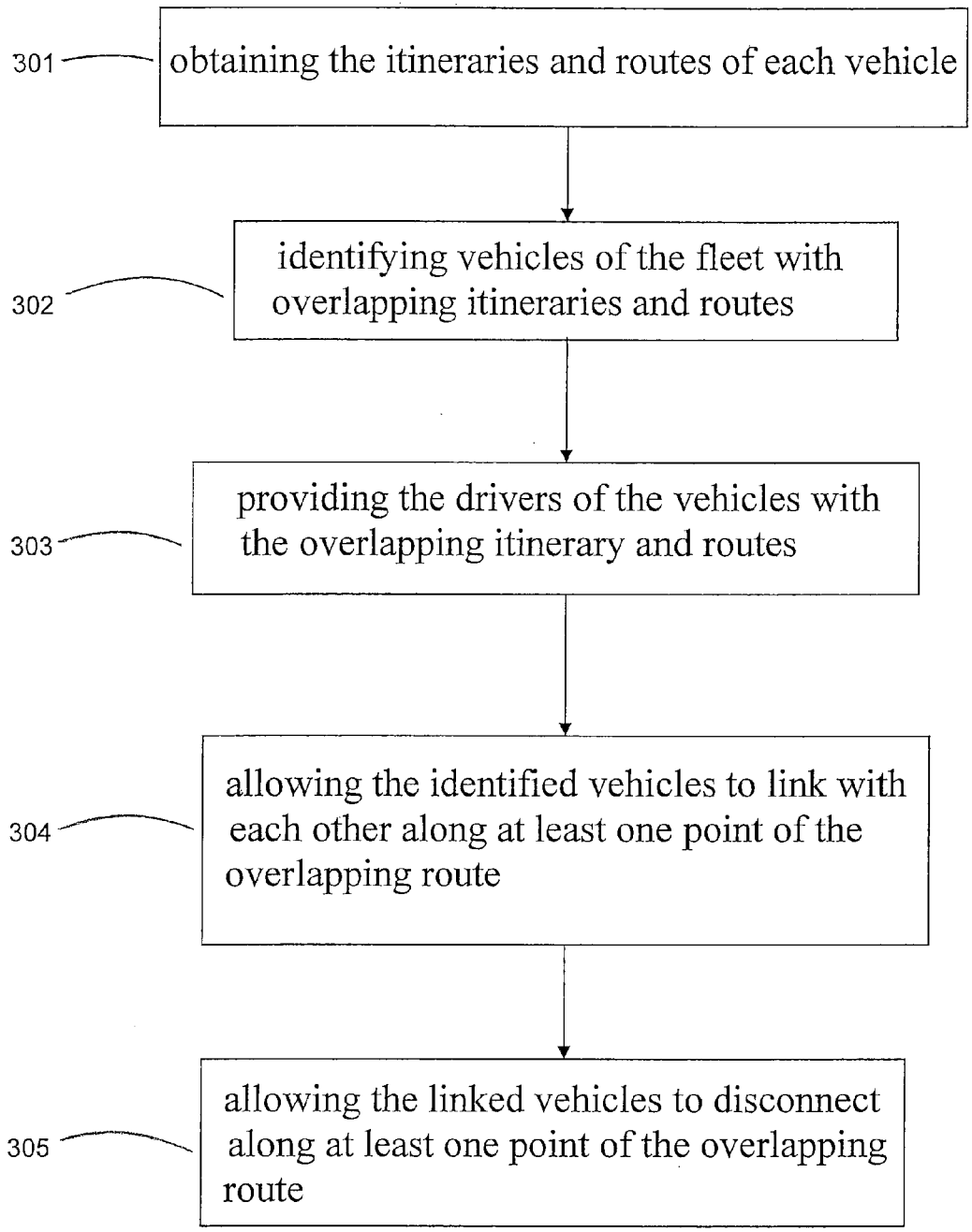
FIG. 6 is a flow chart depicting another embodiment of the disclosed method.

Further, a flow chart for a method of streamlining operation and collective energy efficiency of a fleet of vehicles is depicted in FIG. 6. The method may include the steps of: obtaining the itineraries and routes of each vehicle 301; identifying vehicles of the fleet with overlapping itineraries and routes 302; providing the drivers of the vehicles with the overlapping itinerary and routes 303; and allowing the identified vehicles to link with each other along at least one point of the overlapping route 304. In a refinement, the method may further include the optional step of allowing the linked vehicles to disconnect along at least one point of the overlapping route 305.

When linked, the distance between the two vehicles is sufficiently close for the trailing vehicle to receive significant benefit by reduction in aerodynamic drag. It is contemplated that the vehicles are close enough together that they function aerodynamically as similar to one vehicle, i.e. most of the air displaced by the lead vehicle continues over and around the trailing vehicle rather than impacting into the front of the trailing vehicle. To accomplish this reduction in aerodynamic drag, the extendable-retractable linkage allows the vehicles to be placed at the appropriate distance with respect to the configurations of the vehicles and the features of the roadway to be traveled.

By using the disclosed linking system, the trailing vehicle generally achieves both significantly reduced aerodynamic drag and substantially improved fuel economy when moving at relatively high speed. The leading vehicle may also achieve some reduction in aerodynamic drag and improvement in fuel economy, although not as dramatic as those achieved by the trailing vehicle.

Numerous modifications and variations of the present invention are possible in light of the above disclosure. It is therefore to be understood that, within the scope of the appended claims, the invention may be practiced otherwise than as specifically described herein. While only certain embodiments have been set forth, alternatives and modifications will be apparent from the above description to those skilled in the art. These and other alternatives are considered equivalents and within the spirit and scope of this disclosure and the appended claims.

What is claimed:

1. A method of streamlining operation and collective energy efficiency of a fleet of vehicles, comprising:
    obtaining itineraries and routes of each vehicle and uploading the itineraries and routes to a commonly accessible database;
    the database identifying vehicles of a fleet with overlapping itineraries and routes;
    providing drivers of the vehicles with the overlapping itinerary and routes;
    dispatching the fleet of vehicles;
    the database informing the drivers of a proposed time and location to link with each other; and
    allowing identified vehicles to link with each other along at least one point of the overlapping route.

2. The method of claim 1, further comprising the step of allowing the linked vehicles to disconnect along at least one point of the overlapping route.

3. The method of claim 1, wherein the identified vehicles are in motion during linking.

4. A method of linking individual vehicles, comprising the steps of:
    providing a commonly accessible database;
    uploading itineraries and routes of a plurality of individual vehicles to the database;
    the database matching the itineraries and routes of the individual vehicles for maximum overlapping;
    providing drivers of vehicles with maximized overlapping itineraries and routes;
    the database informing the drivers of a proposed time and location to link with each other; and
    allowing the vehicles with the maximized overlapping itineraries and routes to link with each other along at least one point of the overlapping route.

5. The method of claim 4, wherein the database is in a form of an Internet website.

6. The method of claim 4, wherein the vehicles are in motion during linking.

* * * * *